United States Patent Office 2,923,702
Patented Feb. 2, 1960

2,923,702

PROCESS AND CATALYST FOR PRODUCTION OF OLEFIN POLYMERS

Harold D. Lyons and Gene Nowlin, Bartlesville, Okla., assignors to Phillips Petroleum Company, a corporation of Delaware No Drawing. Application July 5, 1955
Serial No. 520,164

10 Claims. (Cl. 260—94.9)

This invention relates to the polymerization of olefins. In one aspect, this invention relates to an improved method for polymerizing olefins and to a novel catalyst therefor.

Reactions for polymerizing olefins are well known in the art and are generally carried out in the presence of catalysts. One class of catalysts which has been used in the polymerization of monoolefins, particularly ethylene, is organometal compounds, for example, triethylaluminum, and the polymers which have been obtained in accordance with this method are generally liquid or low molecular weight solid polymers. Frequently, the polymers obtained are dimers or trimers of the olefin charged. However, it is often desired to produce higher molecular weight polymers which have desirable properties of heat stability and can be molded into vessels, pipes and tubing. Such uses cannot be made of the lower molecular weight polymers, for example, a polymer having a molecular weight of about 2000, since a polymer of this molecular weight is a wax-like material.

This application is a continuation-in-part of our copending U.S. application, Serial No. 507,144, filed May 9, 1955, now abandoned.

An object of this invention, therefore, is to provide an improved process for the production of olefin polymers.

A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising a mixture of a molybdenum compound selected from the group consisting of oxyhalides, hydroxyhalides, oxyhydroxyhalides of molybdenum and complex salts of halides of molybdenum and said oxyhalides with a member selected from the group consisting of halides of sodium, potassium, lithium, rubidium, cesium and ammonia and an organometal halide corresponding to the formula $R_xMX_y$ wherein R is a saturated acyclic hydrocarbon radical, a saturated cyclic hydrocarbon radical, an aromatic hydrocarbon radical, or combinations of these radicals, wherein M is a metal selected from the group consisting of aluminum, gallium, indium, thallium, and beryllium and wherein X is a halogen, and wherein $x$ and $y$ are integers, the sum of $x$ and $y$ being equal to the valence of the metal. The improvement obtained when polymerizing an olefin in the presence of our novel catalyst is, firstly, that polymers of much higher molecular weight can be obtained than is true when certain of the prior art catalysts have been employed, and secondly, the polymerization reaction, particularly for ethylene, can be initiated and carried out at considerably lower temperatures and pressures than are necessary when employing the catalysts and the processes of the prior art.

The molybdenum compound component of our catalyst system can be any of the oxyhalides, hydroxyhalides, and oxyhydroxyhalides, including chlorides, bromides, iodides and fluorides. Complex salts of the molybdenum halides and oxyhalides with one of the group consisting of sodium, potassium, lithium, rubidium, cesium, and ammonium halides can also be employed in our catalyst system. Mixtures of these complex halides and complex salts can also be used. Any of the known and available complex halides and complex salts, as defined hereinabove, are useful in our polymerization process. Specific examples of the numerous derivatives which fall within the scope of our invention are as follows: Molybdenum dioxydichloride ($MoO_2Cl_2$), molybdenum trioxyhexachloride ($Mo_2O_3Cl_6$), molybdenum pentoxyoctobromide ($Mo_3O_5Br_8$), molybdenum dihydroxytetrachloride $$(Mo_3(OH)_2Cl_4)$$

molybdenum hydroxytetrabromide ($Mo(OH)Br_4$), molybdenum hydroxytetrachlorobromide ($Mo_3(OH)BrCl_4$), molybdenum tetroxyhydroxychloride ($Mo_2O_4(OH)Cl$), molybdenum oxydihydroxydichloride ($MoO(OH)_2Cl_2$), molybdenum oxyhydroxydibromide ($MoO(OH)Br_2$), ammonium molybdenum pentachloride ($(NH_4)_2MoCl_5$), potassium molybdenum hexachloride ($K_3MoCl_6$), potassium molybdenum pentachloride ($K_2MoCl_5$), rubidium molybdenum pentachloride ($Rb_2MoCl_5$), ammonium molybdenum pentabromide ($(NH_4)_2MoBr_5$), sodium molybdenum hexabromide ($Na_2MoBr_6$), potassium molybdenum tetrachlorotetraiodide ($K_2Mo_3Cl_4I_4$), ammonium molybdenum oxypentabromide ($(NH_4)_2MoOBr_5$), potassium molybdenum oxypentabromide ($K_2MoOBr_5$), ammonium molybdenum oxypentachloride $$((NH_4)_2MoOCl_5)$$

cesium molybdenum dioxytetrachloride ($Cs_2MoO_2Cl_4$), rubidium molybdenum dioxytrichloride ($RbMoO_2Cl_3$), potassium trimolybdenum dioxyheptachloride $$(KMo_3O_6Cl_7)$$

cesium trimolybdenum dioxyheptachloride ($CsMo_3O_6Cl_7$), and the like. The molybdenum compounds which are preferably used in the catalyst composition of this invention are postassium molybdenum hexachloride ($K_3MoCl_6$) and molybdenum oxydihydroxydichloride $$(MoO(OH_2)Cl_2)$$

The molybdenum compounds listed hereinabove are preferably employed in the anhydrous or substantially anhydrous form.

Our catalyst comprises a mixture of a molybdenum compound and at least one organometal halide corresponding to the formula $R_xMX_y$, wherein R is a saturated acyclic hydrocarbon radical, a saturated cyclic hydrocarbon radical, an aromatic hydrocarbon radical, or mixtures of these radicals, wherein M is a metal selected from the group consisting of aluminum, gallium, indium, thallium and beryllium, and wherein X is a halogen. The $x$ and $y$ are integers and the sum of $x$ and $y$ is equal to the valence of the metal M. X can be any of the halogens, including chlorine, bromine, iodine and fluorine. The saturated acyclic hydrocarbon radicals, saturated cyclic hydrocarbon radicals, and aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following: $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), $C_{17}H_{35}BeI$, $CH_3BeBr$ and the like.

The catalyst compositions falling within this disclosure which are preferred because their use to catalyze the polymerization of olefins provides relatively high molecular weight polymers and/or permits the use of relatively low reaction temperatures and pressures are the following: a mixture of potassium molybdenum hexachloride with an approximately equimolar mixture of ethylaluminum dichloride and diethylaluminum chloride; and a mixture of molybdenum oxydihydroxydichloride with an approximately equimolar mixture of ethylaluminum dichloride and diethylaluminum chloride.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of alkyl metal halide to molybdenum compound will be in the range of 0.05 to 50, preferably 0.1 to 5, mols of alkyl metal halide per mol of molybdenum compound.

The materials which are polymerized, in accordance with this invention, are polymerizable hydrocarbons, broadly. Preferably, the polymerizable hydrocarbons are olefins containing a $CH_2=C<$ radical. The most preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylenes can also be used, such as butene-2, pentene-2, hexene-2, heptene-3, 2-methyl-butene-1, 2-methyl-hexene-1, 2-ethyl-heptene-1, and the like. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a pentene. Also, aryl olefins, e.g., styrene and alkyl-substituted styrenes can be polymerized to a solid polymer in the process of this invention.

One of the important advantages obtained in the polymerization of olefins in the presence of our novel catalyst is that lower temperatures and pressures can be used than in certain of the prior art processes. The temperature can be varied over a rather broad range, however, such as from zero to 500° F. The preferred temperature range is from 100 to 350° F. Although pressures ranging from atmospheric up to 30,000 p.s.i.g. or higher can be employed, a pressure in the range of 100 to 1000 p.s.i.g. is usually preferred.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, halogenated paraffins, cycloparaffins and/or aromatic hydrocarbons which are relatively inert, non-deleterious and liquid under the conditions of the process. The lower molecular weight alkanes, such as propane, butane, and pentane can be used as well as the higher molecular weight paraffins and cycloparaffins, such as isooctane, cyclohexane and methylcyclohexane. Halogenated aromatics, such as chlorobenzene, and aromatic diluents can also be used, such as benzene, toluene, and the like, particularly when operating at higher temperatures. Mixtures of these diluents can also be used, such as benzene, toluene, and the like, particularly when operating at higher temperatures.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends upon the temperature at which the process is carried out to a great extent. The residence time also varies with the specific olefin that is polymerized. However, the residence time for the polymerization of aliphatic monoolefins, within the preferred temperature range of 100 to 350° F., falls within the range of one second to an hour or more. In the batch process, the time for the reaction can vary widely, also, such as up to 24 hours or more.

Various materials are known to be poisons for the catalyst composition of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable, also, that air and moisture be removed from the reaction vessel before the reaction is carried out.

At the completion of the polymerization reaction, when a batch process is used, the reactor is cooled to about room temperature, any excess olefin is vented and the contents of the reactor, including the solid polymer swollen with diluent, is removed from the reactor. The total reactor effluent is then treated to inactivate the catalyst, as by washing with an alcohol. The alcohol-washing step is preferably carried out in a comminution zone, such as a Waring Blendor, so that a finely-divided polymer is thereby provided. The polymer is then separated from the alcohol and diluent by decantation or filtration and then the polymer is dried. When the process of the invention is carried out continuously, the total effluent from the reactor, including polymer, diluent and catalyst system is pumped from the reactor as a slurry to a catalyst-inactivating zone where the reactor effluent is cooled and contacted with a suitable catalyst-inactivating material, such as an alcohol, to precipitate the polymer. As in the batch process, it is desirable that the alcohol-treatment step be carried out in a comminution zone so that a finely divided polymer is thereby produced. The diluent and alcohol are then separated from the polymer, for example by filtration and the polymer is then dried. The diluent and alcohol can be separated, for example by fractional distillation, and reused in the process.

EXAMPLE I

Ethylene was polymerized in a 2700 cubic centimeter stainless steel rocking autoclave in the presence of a catalyst consisting of potassium molybdenum hexachloride and a mixture of diethylaluminum chloride and ethylaluminum dichloride. The autoclave was charged with the diluent benzene prior to the addition of the catalyst components. The reactor was flushed with nitrogen prior to and during the charging procedure to prevent contact of the catalyst with air or moisture. The ethylene feed was passed through a purification system to remove oxygen, carbon dioxide and water vapor prior to entering the reactor. The purification system comprised a pyrogallol solution, a sodium hydroxide solution, and a drying agent.

In this run the catalyst, consisting of 1 gram of potassium molybdenum hexachloride ($K_3MoCl_6$) and 3 cubic centimeters of a mixture of diethylaluminum chloride and ethylaluminum dichloride, together with 500 cubic centimeters of benzene (dried over sodium and distilled) was placed in the reaction vessel while maintaining an atmosphere of pre-purified nitrogen. The initial temperature of the reactor contents was 75° F. The ethylene, after passing through the usual purification treatment, was added to the reactor until a pressure of 300 p.s.i.g. was obtained. At this point the reactor and contents were heated and at the end of a 51-minute period, the temperature was 179° F. and the pressure was about 410 p.s.i.g. Based on previous experience, it appeared from these conditions that the reaction had been initiated sometime during this heating period of 51 minutes. Heating was continued for an additional 52 minutes, at the end of which time the temperature was about 270° F. and the pressure was approximately 490 p.s.i.g. At this point, heating of the reactor was discontinued. It appeared that the line leading to the pressure gauge had become plugged. The autoclave and contents were allowed to rock for an additional 1 hour and 37 minutes. At the end of this time, the bomb was removed and cooled with tap water until it had reached room temperature. Any unreacted ethylene was vented and the polymer was removed from the reaction vessel. The polymer was mixed with methyl alcohol and comminuted in a Waring Blendor. The solid material was filtered from the liquid and was then dried in a vacuum oven at about 75° C. and an absolute pressure of less than 10 mm. of mercury. Fifteen grams of a tannish-white polymer was obtained.

The properties of a compression molded sample of this ethylene polymer are presented below in Table I.

Table I

| | |
|---|---|
| Melting point | 245±4° F. |
| Density, grams per cc | 0.983. |
| Viscosity (inherent) | Insoluble in tetralin. |
| Impact strength (by falling ball method) | Broke at 18″. |
| Color | Dark brown. |

The potassium molybdenum hexachloride used in this example was obtained from the S. W. Shattuck Chemical Company of Denver, Colorado.

The mixture of diethylaluminum chloride and ethylaluminum dichloride was prepared by placing 150 grams of aluminum shavings in a flask fitted with a reflux condenser and heated to about 70° C. A trace of iodine was added to the flask to act as a catalyst and ethyl chloride was charged to the flask in liquid phase. The temperature of the reaction mixture was maintained in the range of 120 to 150° C. during the addition of ethyl chloride and the reaction mixture was maintained under a nitrogen atmosphere. When substantially all of the aluminum shavings had reacted with the ethyl chloride, the liquid product was removed from the flask and fractionally distilled at 4.5 millimeters mercury pressure in a packed distillation column. As set forth above, 3 cubic centimeters of the distillate, boiling at 72 to 74° C. at 4.5 millimeters mercury pressure, was used in the catalyst composition of this invention. This fraction boiling at 72 to 74° C. was analyzed and was found to contain 47.4 weight percent chlorine. The theoretical chlorine content for an equimolar mixture of diethylaluminum chloride and ethylaluminum dichloride is 43 weight percent.

EXAMPLE II

Ethylene was polymerized in the same equipment and using the same general procedure as described in Example I.

The catalyst, consisting of 1 gram of molybdenum oxydihydroxydichloride ($MoO(OH)_2Cl_2$) and 4 cubic centimeters of a mixture of ethylaluminum dichloride and diethylaluminum chloride, together with 400 cubic centimeters of cyclohexane (dried over sodium and distilled) was placed in the reaction vessel while maintaining an atmosphere of pre-purified nitrogen. The reactor was pressured with ethylene to 300 p.s.i.g. at a temperature of 85° F. The reactor and contents were heated and at the end of 35 minutes the temperature had increased to 145° F. and the pressure had increased to 325 p.s.i.g. From previous experience, these conditions indicated that the polymerization reaction had been initiated during this 35-minute heating period. Heating was continued and at the end of an additional 39-minute period the temperature had increased to 200° F. and the pressure had increased to 400 p.s.i.g. After an additional 33-minute heating period the temperature was about 235° F. and the pressure was indicated to be 425 p.s.i.g. After an additional 13-minute period the temperature had increased to 250° F. and the pressure was indicated as 400 p.s.i.g. Heating was continued for an additional 40 minutes, at the end of which period the temperature had increased to 290° F. and the pressure was indicated as being unchanged, i.e., 400 p.s.i.g. It appeared at this point in the run that the line leading to the pressure gauge had become plugged and that the latter pressure readings had no significance. The reaction was continued for an additional period of 6½ hours with the temperature being controlled at about 300° F. No further change in pressure was indicated on the pressure gauge. At the end of this period heating was discontinued and the reactor and contents were allowed to rock overnight and cooled down to room temperature. When the bomb was opened at the end of this rocking period, the pressure appeared to be atmospheric, indicating that there was little, if any, ethylene present in the reactor. The polymer, which was tannish in color, was mixed with methyl alcohol and comminuted in a Waring Blendor. The finely divided ethylene polymer was filtered from the liquid and dried in a vacuum oven at approximately 75° F. and absolute pressure of less than 10 mm. of mercury. Forty-five grams of dry polyethylene powder, which was tannish-white in color, was obtained.

The properties of a compression molded sample of this ethylene polymer are presented below in Table II.

Table II

| | |
|---|---|
| Melting point | 247±3° F. |
| Density, grams per cc | 0.919. |
| Viscosity (inherent)[1] | 6.49. |
| Molecular weight (based on inherent viscosity) | 158,800. |
| Impact strength (by falling ball method) | >72″. |
| Flexibility | Good. |
| Melt index | Material could not be extruded. |

[1] The solubility of this polymer in tetralin is so low that it was necessary to determine the inherent viscosity on a solution employing 0.1 gram of polymer per 100 milliliters of tetralin. The determination was made at 130° C.

The MoO(OH)$_2$Cl$_2$ was obtained from the S. W. Shattuck Chemical Company of Denver, Colorado. The mixture of diethylaluminum chloride and ethylaluminum dichloride was prepared according to the procedure described in Example I.

The polymers and copolymers produced in accordance with this invention have utility in applications where solid plastics are used. They can be molded to form articles of any desired shape, such as bottles and other containers for liquids. Also, they can be formed into pipe by extrusion.

As will be evident to those skilled in the art, many variations and modifications can be practiced within the scope of the disclosure and claims to this invention. The invention resides in an improved polymerization process for olefins as described herein comprising the use of a novel catalyst composition and the polymers so produced, said catalyst composition comprising a molybdenum compound as defined herein and an organometal halide corresponding to the formula R$_x$MX$_y$, wherein R is at least one member selected from the group consisting of saturated acyclic hydrocarbon radicals, saturated cyclic hydrocarbon radicals, and aromatic hydrocarbon radicals, M is a metal selected from the group consisting of aluminum, gallium, indium, thallium and beryllium, X is a halogen, $x$ and $y$ are integers, the sum of $x$ and $y$ being equal to the valence of said metal.

We claim:

1. A method for polymerizing an aliphatic 1-olefin having up to and including 8 carbon atoms per molecule which comprises contacting said olefin with a catalyst comprising a molybdenum compound selected from the group consisting of oxyhydroxyhalides of molybdenum and a molybdenum compound having the formula MMoX, wherein M is an alkali metal selected from the group consisting of sodium, potassium, lithium, rubidium, and cesium, and X is a halogen, and an organometal halide corresponding to the formula R$_x$AlX$_y$, wherein R is an alkyl radical, X is a halogen, and $x$ and $y$ are integers, the sum of $x$ and $y$ being equal to the valence of aluminum.

2. A method for polymerizing an aliphatic 1-olefin having up to and including 8 carbon atoms per molecule which comprises contacting said olefin with a catalyst comprising a molybdenum compound selected from the group consisting of oxyhydroxyhalides of molybdenum and a molybdenum compound having the formula MMoX, wherein M is an alkali metal selected from the group consisting of sodium, potassium, lithium, rubidium, and cesium, and X is a halogen, and an organometal halide corresponding to the formula R$_x$AlX$_y$, wherein R is an alkyl radical, X is a halogen, and $x$ and $y$ are integers, the sum of $x$ and $y$ being equal to the valence of aluminum, at a temperature in the range from zero to 500° F. in the presence of a hydrocarbon diluent, inert and liquid under conditions of the method, at a pressure sufficient to maintain said diluent in liquid phase, and recovering the solid polymer so produced.

3. A method in accordance with claim 2 wherein the ratio of the amount of said molybdenum compound and said organometal halide is in the range of 0.1 to 5 mols of said organometal halide per mole of said molybdenum compound.

4. A method for polymerizing ethylene which comprises contacting said ethylene with a catalyst consisting essentially of a mixture of potassium molybdenum hexachloride and an approximately equimolar mixture of ethylaluminum dichloride and diethylaluminum chloride.

5. A method for polymerizing ethylene which comprises contacting said ethylene with a catalyst consisting essentially of a mixture of molybdenum oxydihydroxydichloride and an approximately equimolar mixture of ethylaluminum dichloride and diethylaluminum chloride.

6. A catalyst composition comprising a molybdenum compound selected from the group consisting of oxyhydroxyhalides of molybdenum and a molybdenum compound having the formula MMoX, wherein M is an alkali metal selected from the group consisting of sodium, potassium, lithium, rubidium, and cesium, and X is a halogen, and an organometal halide corresponding to the formula R$_x$AlX$_y$, wherein R is an alkyl radical, X is a halogen, and $x$ and $y$ are integers, the sum of $x$ and $y$ being equal to the valence of aluminum.

7. A method for polymerizing ethylene which comprises contacting ethylene with a catalyst consisting essentially of a mixture of from 0.1 to 5 mols of an approximately equimolar mixture of diethylaluminum chloride and ethylaluminum dichloride per mol of molybdenum oxydihydroxydichloride, in the presence of a hydrocarbon diluent, inert and liquid under conditions of the method, a temperature in the range of 100 to 350° F. and a pressure in the range of 100 to 1000 p.s.i.g.

8. A method for polymerizing ethylene which comprises contacting ethylene with a catalyst consisting essentially of a mixture of from 0.1 to 5 mols of an approximately equimolar mixture of diethylaluminum chloride and ethylaluminum dichloride per mol of potassium molybdenum hexachloride, in the presence of a hydrocarbon diluent, inert and liquid under conditions of the method at a temperature in the range of from 100 to 350° F., and a pressure in the range of from 100 to 1000 p.s.i.g.

9. A catalyst composition consisting essentially of a mixture of potassium molybdenum hexachloride, diethylaluminum chloride and ethylaluminum dichloride.

10. A catalyst composition consisting essentially of a mixture of molybdenum oxydihydroxydichloride, diethylaluminum chloride and ethylaluminum dichloride.

References Cited in the file of this patent

UNITED STATES PATENTS

| | | |
|---|---|---|
| 2,396,920 | Larson | Mar. 19, 1946 |
| 2,439,765 | Walker | Apr. 13, 1948 |
| 2,600,654 | Jacobson | June 17, 1952 |
| 2,721,189 | Anderson et al. | Oct. 18, 1955 |
| 2,822,357 | Brebner et al. | Feb. 4, 1958 |

FOREIGN PATENTS

| | | |
|---|---|---|
| 534,888 | Belgium | Jan. 31, 1955 |

OTHER REFERENCES

Interference Law and Practice (Rivise and Caesar), published by the Michie Co., Law Publishers (Charlottesville, Va.), 1940 (page 321 relied on).

Polyethylene (Raff), published by Interscience Publishers Inc. (New York), 1956 (page 518 relied on).